E. R. HEWITT.
TIRE.
APPLICATION FILED JAN. 20, 1915.
1,135,183.
Patented Apr. 13, 1915.
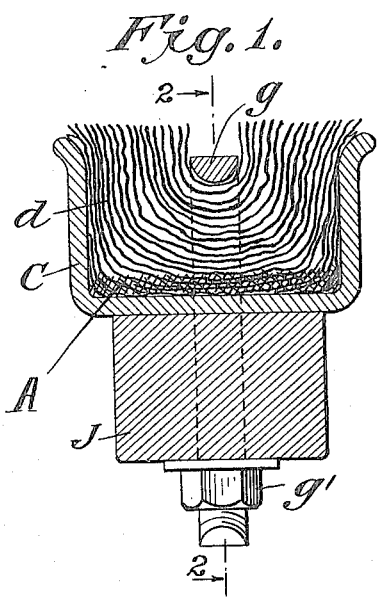
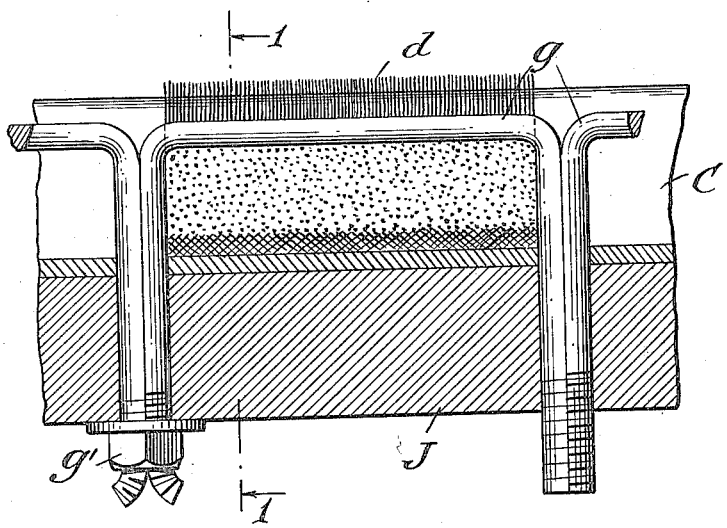
Attest:
Inventor:
Edward R. Hewitt
by Redding ... Goodlett
Attys.

UNITED STATES PATENT OFFICE.

EDWARD R. HEWITT, OF MIDVALE, NEW JERSEY.

TIRE.

1,135,183.  Specification of Letters Patent.  Patented Apr. 13, 1915.

Original application filed March 6, 1908, Serial No. 419,444. Divided and this application filed January 20, 1915. Serial No. 3,250.

*To all whom it may concern:*

Be it known that I, EDWARD R. HEWITT, a citizen of the United States, and a resident of Midvale, in the county of Passaic, in the State of New Jersey, have invented certain new and useful Improvements in Tires, of which the following is a specification, reference being had to the accompanying drawings, forming a part hereof.

This application is a division of a former case filed by the present applicant on March 6, 1908, Ser. No. 419,444, and seeks to cover a form of tire illustrated and described in said former application and embodying the invention sought to be covered thereby.

The invention relates to tires and more particularly to a construction or fashioning of the tread or road contacting portion of the tire, and has for its purpose, among other things, the preventing of skidding or side-slipping, the increasing of the traction, the deadening of the noise or vibration, and while effecting these in a most approved, efficient and durable manner, permits the operator to replace or renew readily the tread or wearing portion of the wheel or the entire tire, or portions of the tire, in a most efficient, economical and effective manner.

While the invention may be variously practised, in the accompanying drawings is shown one practical embodiment of the invention, in which—

Figure 1 is a view in transverse section taken through the felly of a wheel along the plane indicated by the line 1—1 of Fig. 2, and showing the disposition of the wires constituting the tire. Fig. 2 is a fragmentary view in section of a portion of the felly shown in Fig. 1, taken along the plane indicated by the line 2—2 of this figure and showing particularly the staples for fastening the pads of the tire in position.

In the drawings a channel iron section is shown mounted on a felly J in Fig. 1, the sides of the channel in Fig. 1 being indicated by the reference character C and having mounted therebetween the pads of wires which lie between the retaining devices hereinafter described whereby the tire as a whole is built up. Each pad or section is composed of a mass of wires $d$ extending transversely of the tread of the wheel and bent reversely on themselves into substantially a U-shape, so that the base or pad of the tire is formed of the mid-section of the wires, while the tread is formed of the free ends of the wires. It will be noted that each wire extends outwardly in a substantially radial direction with respect to the wheel and has its ends terminating at the tread portion of the tire. In manufacture, the pads may be built up conveniently by winding a continuous wire on a spool and then cutting the reel thus formed along a diametrical plane, each half of the reel being of suitable form and composition to be placed directly within the channel C and form one of the improved pads. If desired the wires may be united along their mid-section by spelter indicated at A so as to form a substantially solid base portion with which the tread portion is, in effect, integral.

The pad formed, in the manner described, may conveniently be held removably in place in the channel C by means of a retaining member $g$ which may be clamped in position on the tread surface of the pad and lie between the reversely bent portions of the wires $d$, so that each wire has a branch extending from the base portion of the pad to the tread portion on each side of the retainer $g$. Adjacent each end of each pad the retaining wire $g$ is bent at right angles to the tread of the pad and is extended through the felly of the wheel where it has its free end in threaded engagement with a nut $g'$. The length of each pad, it is evident, will be determined by the distance between the legs of the wire $g$. While no illustration of a pad, as such, is given, the length of each will be as indicated in dotted lines in Fig. 2. In cross-sectional form it has been found convenient to form the wire $g$ of semi-cylindrical shape so that its exposed surface is flat and the part of its surface in contact with the wires $d$ is cylindrical. By giving the wire $g$ such shape, it also becomes possible to pass the proximate legs of adjacent wires through a single hole in the felly J and unite these legs by means of a single nut $g'$. When fully equipped with the sections or pads the wheel in operation will, owing to the load, upset the individual wires compacting them to an extent dependent upon the space initially left between the individual wires and also dependent upon the quality of metal in the wire. If the wire is of soft steel the individual wires are bent more or less, and irregularly, so as to form what might be termed a matted structure. To a slight extent yielding results after a short usage. When so matted down the pads retain a slight spring, but the ends either direct or turned over present a rough surface which being a metal surface withstands the wear. Owing to the plurality of members comprising the structure the surface will always remain rough. While particularly sharp obstructions at intervals make unusual indentations about the tire, the general effect of the roughness of the roads is to leave a substantially even surface after short usage.

In some cases it is preferable to run the tires when mounted on wheels over a prepared rough surface before they are put into regular use in order to produce the tread surface which otherwise would result from limited service, but which in regular service might be irregular as above indicated owing to unexpected obstructions on the road. When the tire is once "run in", or, as it might be said, worn to a permanent tread, the effect of an absolutely anti-skidding or non-slipping tire is secured. At the same time, the wear which is all on metal makes the tire as durable as a solid metal tire.

It will be noticed that in the form of tire illustrated there is no solid body of metal, but the division of the metal tread and wearing part into so many small portions prevents the "ringing," as the noise made by a solid metal tire is frequently called. Furthermore, the mass of wire has a deadening effect not alone on noise but on vibration.

The construction is intended more particularly for heavy trucks which are comparatively slow moving, while at the same time under certain circumstances and in certain forms the construction would, of course, be equally applicable to other vehicles. The increased traction makes the tire particularly applicable to the driving wheels of self-propelled vehicles. Though the tread surface after wear may resemble a tangled mass of wire, it will be seen that the relatively large number of parts making up the tread, while insuring a roughness, does not involve any large excrescences which would damage a road. It is well known that the attempt to prevent skidding on heavy wheels, such as on self-propelled fire engines, by the use of, for instance, cleats for solid metal wheels or heavy studs, results in damage to improved pavement, while such protrusions in themselves wear smooth. The wires in the form of the construction shown may be more and more upset or matted down, and in fact gradually worn off, but no solid portion of the tire body will exist at any time, and the entire structure will be subject to the same effect of the road and will be worn even in spite of any temporary dents or the like.

It will be seen that the invention is capable of embodiment in various ways and various combinations and is not intended to be confined to the particular form shown and described.

I claim as my invention:

1. A tire having a mass of wires reversely bent on themselves and closely compacted for a portion of their length adjacent their mid-sections to form a continuous and practically solid base portion and free at their extremities to form a tread portion.

2. A tire formed of pads, each composed of a mass of wires reversely bent on themselves and closely compacted and united each with each for a portion of their length adjacent their mid-sections to form a continuous and practically solid base portion and free at their extremities to form a tread portion integral with the base.

3. A tire composed of a series of pads formed of a mass of wires each reversely bent on itself into a substantially U-shaped outline, retainers for the pads each disposed between branches of the wires, and means engaging said retainers for maintaining them in position on the felly.

4. A tire composed of a series of pads each formed of a mass of wires bent into U-shaped outline and having the free ends thereof exposed to engage the road surface, retainers for said pads each formed of U-shaped outline and of semi-cylindrical cross-section and having the base of the U extending longitudinally of the tread portion of its respective pad and disposed between the branches of the wires in said pad and having the branches of the U extending through the felly in contact with the proximate branches of the adjacent retainers, and nuts in threaded engagement with the free ends of the retainers.

This specification signed and witnessed this 15th day of January A. D. 1915.

EDWARD R. HEWITT.

Signed in the presence of—
 EUGENE R. FALCK,
 WORTHINGTON CAMPBELL.

Copies of this patent may be obtained for five cents each, by addressing the "Commissioner of Patents, Washington, D. C."